United States Patent
Sipos et al.

(10) Patent No.: US 9,969,624 B2
(45) Date of Patent: May 15, 2018

(54) PERSONAL WATER FILTER DEVICE

(71) Applicants: IZIT d.o.o., Zagreb (HR); Laszlo Sipos, Zagreb (HR); Marko Baus, Zagreb (HR); Ivor Zidaric, Zagreb (HR); Igor Stanisljevic, Zagreb (HR); Marinko Markic, Zagreb (HR)

(72) Inventors: Laszlo Sipos, Zagreb (HR); Marko Baus, Zagreb (HR); Ivor Zidaric, Zagreb (HR); Igor Stanisljevic, Zagreb (HR); Marinko Markic, Zagreb (HR)

(73) Assignees: IZIT D.O.O., Zagreb (HR); Laszlo Sipos, Zagreb (HR); Marko Baus, Zagreb (HR); Ivor Zidaric, Zagreb (HR); Igor Stanisljevic, Zagreb (HR); Marinko Markic, Zagreb (HR)

( * ) Notice: Subject to any disclaimer, the term of this patent is extended or adjusted under 35 U.S.C. 154(b) by 0 days. days.

(21) Appl. No.: 15/546,445

(22) PCT Filed: Jan. 26, 2016

(86) PCT No.: PCT/HR2016/000003
§ 371 (c)(1),
(2) Date: Jul. 26, 2017

(87) PCT Pub. No.: WO2016/120646
PCT Pub. Date: Aug. 4, 2016

(65) Prior Publication Data
US 2018/0029898 A1 Feb. 1, 2018

(30) Foreign Application Priority Data

Jan. 28, 2015 (WO) ................ PCT/HR2015/000003

(51) Int. Cl.
*B01D 61/18* (2006.01)
*C02F 1/00* (2006.01)
(Continued)

(52) U.S. Cl.
CPC ............ *C02F 1/002* (2013.01); *B01D 61/025* (2013.01); *B01D 61/027* (2013.01); *B01D 61/08* (2013.01);
(Continued)

(58) Field of Classification Search
CPC .... B01D 61/025; B01D 61/027; B01D 61/08; B01D 61/145; B01D 61/18;
(Continued)

(56) References Cited

U.S. PATENT DOCUMENTS

| 2,670,081 | A | * | 2/1954 | Quinn | .................... | B01D 35/26 |
| | | | | | | 210/266 |
| 7,438,801 | B2 | * | 10/2008 | Scaringe | ................ | B01D 61/08 |
| | | | | | | 210/137 |
| 7,534,349 | B2 | * | 5/2009 | Collins | ..................... | A45F 3/20 |
| | | | | | | 210/257.2 |

FOREIGN PATENT DOCUMENTS

| CN | 203043686 U | 7/2013 |
| DE | 2850663 A1 | 6/1980 |

(Continued)

OTHER PUBLICATIONS

Dow Chemical Water & Process Solutions, FILMTEC™ Reverse Osmosis Membranes Technical Manual, pp. 1-181, http://www.dowwaterandprocess.com/en/resources/reverse-osmosis-technical-manual.

(Continued)

*Primary Examiner* — Terry K Cecil
(74) *Attorney, Agent, or Firm* — RatnerPrestia

(57) ABSTRACT

A simple to operate personal water purification device using membrane type filtration with almost constant pressure exerted to the membrane filter during the operation. The water inlet is connected to the high pressure chamber via a non-return valve. The water from the chamber is injected via the piston into the already pressurized circuit which main- (Continued)

tenance filter working pressure. A pressurized circuit is formed in the concentrate cylinder and the filtration unit. The fluid circulation within the pressurized circuit is enabled via motion of a circulation piston. The permeate outlet produces potable water while the remaining concentrate is returned to the return chamber. The circulation piston and high pressure piston are connected via piston coupling and operated, preferably, by hand activating reciprocal motion of the piston rod. The membrane type filtration can be a ultra-filtration membrane, a nano-filtration membrane or a reverse osmosis membrane.

15 Claims, 6 Drawing Sheets

(51) Int. Cl.
*B01D 61/08* (2006.01)
*C02F 1/44* (2006.01)
*B01D 61/02* (2006.01)
*B01D 61/14* (2006.01)

(52) U.S. Cl.
CPC ........... *B01D 61/145* (2013.01); *B01D 61/18* (2013.01); *C02F 1/441* (2013.01); *C02F 1/442* (2013.01); *C02F 1/444* (2013.01); *B01D 2313/18* (2013.01); *B01D 2313/243* (2013.01)

(58) Field of Classification Search
CPC .......... B01D 2313/18; B01D 2313/243; C02F 1/002; C02F 1/003; C02F 1/441; C02F 1/442; C02F 1/444
See application file for complete search history.

(56) References Cited

FOREIGN PATENT DOCUMENTS

| | | |
|---|---|---|
| DE | 202005018578 U1 | 4/2007 |
| GB | 2473836 A | 3/2011 |
| WO | 2007028044 A1 | 3/2007 |
| WO | 2008101159 A1 | 8/2008 |
| WO | 2013107433 A1 | 7/2013 |

OTHER PUBLICATIONS

International Search Report issued in PCT/HR2016/000003, dated Jun. 2, 2016, 4 pages.
Written Opinion of the International Search Authority issued in PCT/HR2016/000003, dated Jun. 2, 2016, 7 pages.

* cited by examiner

PERSONAL WATER FILTER DEVICE

CROSS REFERENCE TO RELATED APPLICATIONS

This application is the U.S. National Phase application of PCT/HR2016/000003, filed Jan. 26, 2016, which claims priority of PCT/HR2015/000003, filed Jan. 28, 2015, the contents of such applications being incorporated by reference herein.

TECHNICAL FIELD

The present invention relates to personal water purification device. The technical field of said invention is treatment of water, waste water, sewage, or sludge where the filtration technique plays important role. More precisely, the technical field is related to devices with portable filters for producing potable water, e.g. personal travel or emergency equipment, survival kits, combat gear; where the water treatment is performed by filtration, osmosis or reverse osmosis.

Technical Problem

One of the world's biggest problems is the lack of clean drinking water. According to the UN Millennium Development Goals Report 2012, 783 million people, or 11 percent of the global population, remain without access to an improved source of drinking water. Drinking non-potable water is the cause of 80% of all world diseases and every day due to water related diseases 13,000 people die, mostly children. The global water supply/demand imbalance is increasing. This is due to population growth, particularly in arid, water-short regions, contamination of water sources, and inefficient utilization of available supplies.

There are a number of generally accepted technological processes for producing potable water for residential supply. At the same time, there are only a handful of portable products fit for personal drinking water supply. These products usually differ by the device volume, purification efficiency and capacity. The present invention discloses a personal water purification device capable to be carried around, where the water treatment is performed by the membrane type filtration. The membrane type filtration can be selected to be: ultra-filtration, nano-filtration or reverse osmosis.

First technical problem solved by the present invention is the improvement of filtration efficiency by keeping almost constant pressure exerted to the membrane filter during the operation of the said personal water purification device. Effectively, there is no significant pressure drop between pumping strokes within the filtration part of the device, as observed in the solutions already disclosed in the prior art.

Second technical problem solved by the present invention is the way of increasing concentrate flow rate across a membrane filter by recirculation; which is disclosed in one embodiment of the invention. This is direct corollary of the already solved first technical problem. By recirculation we mean the circulation back and forth through the filtration unit. Such recirculation effectively decreases the concentration of the retained substances at the membrane surface, thus decreases the osmotic pressure, followed by additional increases of the filter effectiveness.

Third technical problem solved with the present invention is the design which is compact and has ability to achieve and sustain high pressure needed for the filtration via ultra-filtration membrane, nano-filtration membrane or reverse osmosis membrane.

For the normal operation, the personal water purification device needs power. The device is primary designed to use manpower for reciprocal motion of the piston rod; however any auxiliary device producing the reciprocal motion can be equally used.

Previous State of the Art

Two kind of technical solutions were observed in the related prior art. First, where manpower acting via piston or similar device directly onto the liquid that is subjected to filtration; and second—where manpower increases air pressure acting as a buffer on the liquid that is subjected to filtration. Later is not suitable for the filtration processes using ultra-filtration membrane, nano-filtration membrane or reverse osmosis membrane due to the insufficient operating pressure.

It seems that the closes prior art represents the German patent application DE 2850663 "Gerät zur Durchührung der Umkehrosmose", inventor Hestermann G., which is incorporated by reference; depicted schematically on FIG. 1B in this document in parallel to the preferred embodiment disclosed herewith. Patent application DE 2850663 discloses several embodiments, here is discussed the working principle of embodiment #1.

Embodiment #1 in the prior art relates to text from the last paragraph on page 5 to the first paragraph on page 7, i.e. FIG. 1 in DE 2850663. Underlined numbers refers to the prior art references and the numbers in parenthesis refers to the disclosed invention. On stroke-up; represented by the arrow 8, the waste water is filed within the chamber 12 by suction performed via the piston 5. In the same time high pressure piston 6 starts to pressurize water in the system form the atmospheric pressure to the maximum pressure (HI), i.e. 0->HI, to the filtration membrane. On stroke-down; the waste water stored in the chamber 12 is filling the filtration unit due to the action of the piston 5, discharging in the same time the concentrate through the valve 16, and filling up the chamber 14 for the new cycle. The pressure exerted on the membrane side 2 varies therefore in each working cycle from the low pressure which is slightly above the atmospheric pressure, e.g. the discharge valve 16 is open in stroke-down, to some maximum pressure (HI) exerted in the end of the stroke up. The piston 5, i.e. the piston with the larger diameter in the prior art solution has the role that is similar to the role of piston (30) in the present invention. The high pressure piston 6 has the role of the high pressure piston (41) in the present invention; both pistons are permanently connected one to another.

However, the substantial difference between the solutions disclosed in DE2850663 document and the present invention is that the present invention has one extra working chamber which forms an additional pressurized closed circuit. This working chamber is equipped with the circulation piston (30), ensuring the circulation or re-circulation of the concentrate. Such pressurized closed circuit maintains the achieved maximum pressure (HI) produced by the high pressure piston (41) between the strokes. Therefore, the maintained pressure on the membrane increases the filtration efficiency, especially when circulation piston (30) forces recirculation of the fluid back-and-forth in the pressurized circuit. The differences between the prior art and the disclosed solution are depicted side-by-side in FIG. 1A and FIG. 1B of this document. The difference regarding the maintained pressure on the membrane renders the disclosed invention inventive over the cited prior art. Also, the disclosed invention is capable to work even without discharging the concentrate which is not possible by the DE2850663 embodiments. The auxiliary line in the disclosed invention is in function when rinsing of the membrane is necessary, or when the system is filled up for the first time.

Another document, the Chinese utility model published as CN 203043686U "Portable pressure water purifier", inventors Yang Cheng et. al., which is incorporated by reference; discloses simple personal water purification system. The pressure in the system again varies from the atmospheric pressure to some maximum pressure allowable with the construction between strokes; i.e. sealing means used herewith.

Even simpler solution is disclosed by the German utility model published as DE 202005018578U1 "De-energized pump in combination with diaphragm module for separation . . . ", inventor Kaifel R., which is incorporated by reference, which discloses a hand pump in combination with tubular module with built in membrane means for filtration. Within the said device, a piston motion up produces suction of the fluid into the cylinder. A piston motion down forces already sucked fluid to pass through the membrane means performing fluid filtration, and finally the fluid is pushed out of the working cylinder. The cited invention is different from the disclosed invention having in mind that the membrane pressure varies significantly between strokes.

International patent application published as WO 2007/028044A1 "Dual stage ultrafilter devices in the form of portable filter devices, shower devices, and hydration pack"; inventors Collins G. R. et. al., which is incorporated by reference, discloses dual stage ultrafilter devices in the form of portable filter devices, shower devices, and hydration packs. The cited device is ultrafilter cartridge apparatus that offers two filtration stages, normal and redundant filtration—within a single housing. Redundant filtration or second filtration operation is performed on the filtered water to ensure that water discharged from the device is sterile and suitable for use. The cited invention is convenient two-stage filtration means without recirculation possibility and different from the disclosed invention due to the fact that the membrane pressure varies significantly between strokes.

International patent application published as WO 2008/101159A1 "Compact fluid purification device with manual pumping mechanism"; inventors Collins G. R. et. al., which is incorporated by reference, discloses a compact fluid purification device with manual pumping mechanism. In the preferred embodiment, the mode of operation is similar to one described in the DE202005018578U1. In more advanced embodiment, two stage filtration is proposed in a way that fluid is propelled within the same reciprocal motion cycle across both filtration stages. The cited invention is very convenient one-stage or two-stage filtration means without recirculation possibility and different from the disclosed invention due to the fact that the membrane pressure varies significantly between strokes.

International patent application published as WO 2013/107433A1 "Improved structure for portable ultrafiltration water purifier"; inventor Sun Y., which is incorporated by reference; discloses an improved structure for portable ultrafiltration water purifier. The mode of operation is similar to one already described in the DE202005018578U1, with improved compactness and robustness. Again, the cited invention is very convenient one-stage filtration means without recirculation possibility and different from the disclosed invention due to the fact that the membrane pressure varies significantly between strokes.

U.S. Pat. No. 7,438,801 "Compact personal water purification device"; inventor SCARINGE R. J., which is incorporated by reference; discloses the compact personal water purification device where pumping means did not form a part of the filtration means. Pumping means described in the said prior art can produce ultra-high pressure which is evident from the abstract. The manually operated device requires no additional external power, it is very lightweight, and removes salt and other impurities from source water while also disinfecting it. A symmetrical reverse osmosis membrane coupled with a pre-filter is used to remove salt and impurities from the raw water. Again, the cited invention is very convenient one-stage filtration means without recirculation possibility and different to the disclosed invention due to the fact that the membrane pressure varies significantly between strokes.

Finally, the document that suggests the fluid recirculation possibility together with a filtration, i.e. circulation back and forth through the filtration unit, is found in the patent application GB2473836 "Water filter"; invented by Griffith J. Said, which is incorporated by reference, invention describes system and method of removing bacteriological contaminants from water that comprises a pre-filter, a pump, a hollow fibre membrane module, and a clean water outlet. The system may optional include an air reservoir, wherein air is compressed during the pump down stroke and is expanded during the pump return stroke thus enabling water to flow through the outlet during the return stroke and allowing two directional cross-flow in the hollow fibre membrane module; see page 2, paragraph 3 and 4 of the said document for detailed explanation. Such a cross-flow is basically recirculation of the fluid across the membrane module. It is worth to note that the pressure relief valve is located on the end of the recirculation path; i.e. on the air chamber. That solution differs from the present invention where recirculation is established by a separate pumping means incorporated into the concentrate cylinder. Solution offered by the present invention is more efficient; namely pumping possibilities of separate pumping means is more efficient then the pressure accumulated into the air reservoir in propelling the liquid.

SUMMARY OF THE INVENTION

The present invention discloses a personal water purification device which consist of a filtration unit, two pumping means and a pressurized circuit. The filtration unit is equipped with a filter and a sealing means that separates an inlet chamber for receiving water and an outlet chamber for a concentrate remaining after filtration.

Two pumping means are situated within a concentrate cylinder. The first pumping means consists of a high pressure cylinder and a high pressure piston that is acting on a pressure chamber. The second pumping means consist of the said concentrate cylinder and a circulation piston which simultaneously acts on a return chamber and a water chamber situated within the said concentrate cylinder.

The first pumping means is situated within the water chamber of the second pumping means. The circulation piston and the high pressure piston are coupled by a piston coupling means, both pistons are activated and moved synchronically with a piston rod. A water inlet is connected via a non-return valve to the pressure chamber of the first pumping means that allows the fluid to flow only to the pressure chamber. The pressure chamber of the first pumping means is further connected via another non-return valve to the water chamber of the second pumping means, where said non-return valve allows the fluid to flow only to the water chamber.

The pressurized circuit, which maintains the filter's working pressure, is formed between the second pumping means and the filtration unit. Namely, the water chamber is connected with the filtration unit inlet chamber on one side, and the filtration unit outlet chamber is connected to the water chamber on the pumping means.

The piston rod stroke up intakes the waste water into the pressure chamber of the first pumping means. The piston rod stroke down compresses the waste water situated in the pressure chamber by the high pressure piston. The compression starts from the atmospheric pressure to pressure which is greater than the filter's working pressure within the pressurized circuit. Said compression injects the waste water into the already pressurized circuit of the second pumping means. Reciprocal motion of the circulation piston produces fluid circulation through the pressurized circuit and the filter. This action produces the purified water on a permeate outlet of the filter.

In another embodiment, the water chamber and return chamber are connected via one or more non-return valves enabling the fluid passage from the return chamber to the water chamber when the circulation piston is engaged by the reciprocal motion of the piston rod. That solution enables the on-way fluid circulation within the pressurized circuit. In one variant, said non-return valves can be also formed on the circulation piston as the flap and spring type valve.

Used filter is a membrane type filter selected from: ultra-filtration membrane, nano-filtration membrane or reverse osmosis membrane. Reciprocal motion of the piston rod is achieved by the man power or by the motor exerting reciprocal motion.

In another embodiment a concentrate outlet, that connects previously mentioned outlet chamber and water chamber, is equipped with an auxiliary line and concentrate discharge valve connected to a concentrate discharge line for discharging the concentrate from the said water purification device. Said concentrate discharge valve is operated as a safety valve closed when the pressure in the auxiliary line is below the desired pressure, or in another variant, the concentrate discharge valve is operated manually.

DETAILED DESCRIPTION

Figure 2A:
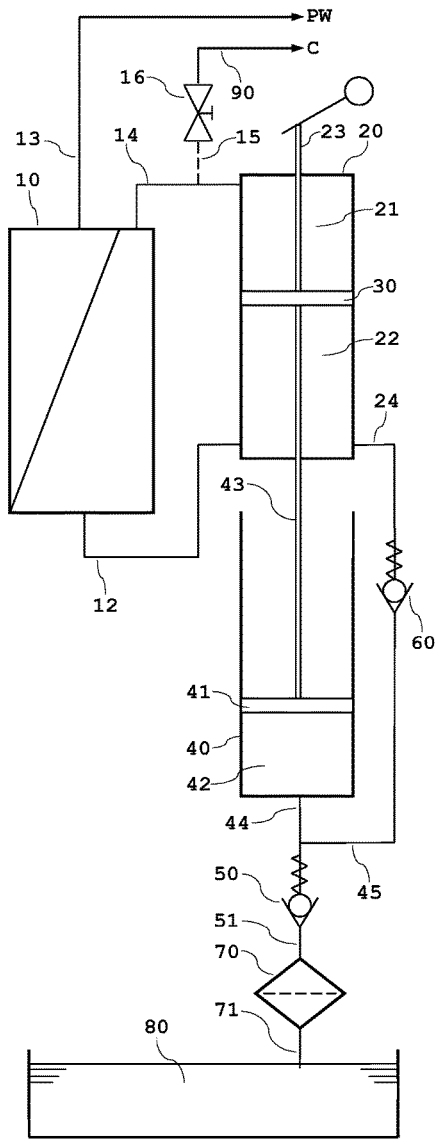
FIG. 2A shows the schematic representation of the first embodiment where the circulation piston, situated within the concentrate cylinder, performs non-perfect sealing with the said cylinder.
Figure 2B:
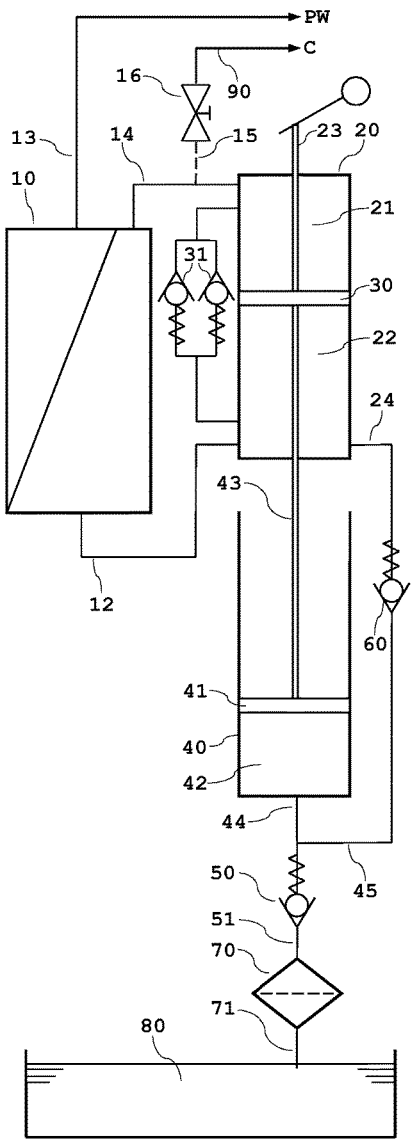
FIG. 2B shows the schematic representation of the second embodiment where return chamber and water chamber of the concentrate cylinder were mutually connected with one or more non-return valves.

In this section two preferred embodiments will be described in details. FIG. 2A and FIG. 2B show this embodiments schematically. The whole system will be explained via circulation from the waste water (80) reservoir through the permeate water producing purified water (PW).

The present invention relates to personal water purification device that consist of filtration unit (10), two pumping means and a pressurized circuit.

Figures 1A, 1B:
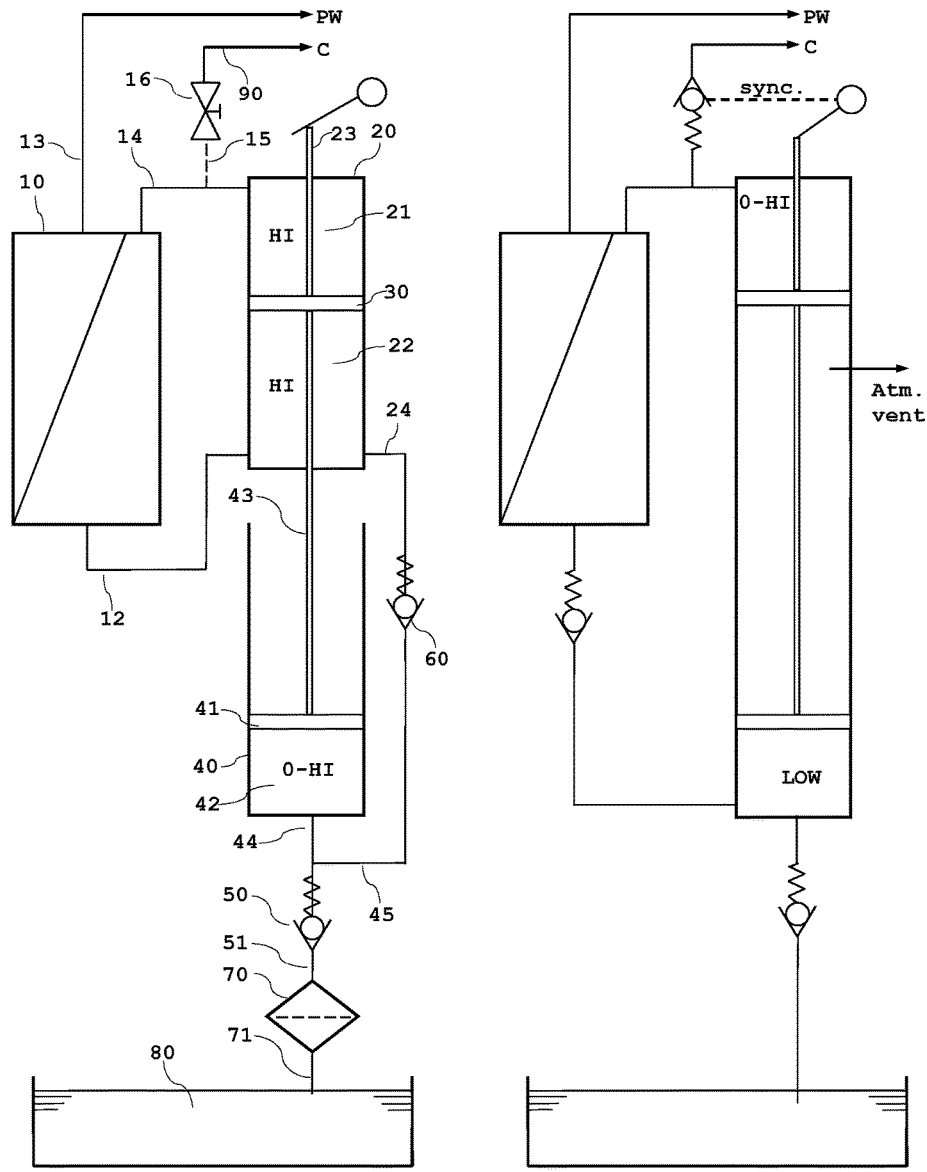
FIG. 1A shows the schematic representation of the preferred embodiment according to an aspect of the invention.
FIG. 1B shows side-by-side the schematic representation of the closest prior art, document DE2850663 embodiment #1.

Filtration unit is schematically presented on FIGS. 1A, 2A and 2B. However, filtration unit—as actually derived—is much better visible on FIGS. 3 and 5 where embodiments are depicted in detail. Filtration unit (10) is formed as cylindrical watertight casing in the manner already known in the art. The casing should be manufactured to withstand inner pressure generated by the pumping means. The cylindrically shaped filter (11) is situated coaxially within the filtration unit (10) and is appropriately sealed by an elastomer sealing mean (17) which role is to fix the filter (11) within the filtration unit (10) and to separate inlet water from the filtration concentrate. Therefore, said sealing means (17) divides filtration unit (10) into two chambers; inlet chamber (18) and outlet chamber (19), see FIGS. 3 and 5.

The cylindrically shaped filter (11) can be selected according to the membrane type filtration and inner device operational pressures; i.e. it can be selected from an ultra-filtration membrane, nano-filtration membrane or reverse osmosis membrane. The standard choice may be the FILMTEC™ membrane, produced by DOW Chemical.

The construction and the use of the FILMTEC™ membrane is described in detail in Chapter 1.7; page 16/181 of Dow Water & Process Solutions FILMTEC™ Reverse Osmosis Membranes Technical Manual and is incorporated by reference. In addition, the above said citation represents detailed manual regarding the use of the said FILMTEC™ membrane. Other membranes obtained from different manufacturers are also welcome while satisfying filtration technical needs. The FILMTEC™ membrane, or any other suitable membrane, once positioned within the filtration unit (10) has an inlet situated within the inlet chamber (18), concentrate outlet situated within the outlet chamber (19), and permeate outlet (13) directed out of the filtration unit (10) and where filtered water comes out. All above said is well known in the art. However, to start a filtration process, the operational/working pressure should be established in the system, and this issue will be addressed later in more detail. The outlet chamber (19) is connected, via concentrate outlet (14), to the return chamber (21) situated into concentrate cylinder (20). On the opposite side, water chamber (22) of the same concentrate cylinder (20) is connected via water inlet (12) with the inlet chamber (18) of the filtration unit (10). In one variant of the invention, the concentrate outlet (14) can be additionally equipped with the auxiliary line (15) having the concentrate discharge valve (16) that drains the system automatically or manually via concentrate discharge line (90). Namely, concentrate discharge valve (16) can be formed as the manual valve, or as the safety valve that remains closed below the desired pressure in auxiliary line (15), i.e. within concentrate outlet (14) and outlet chamber (19) connected thereto. If the concentrate discharge valve

Figure 3:
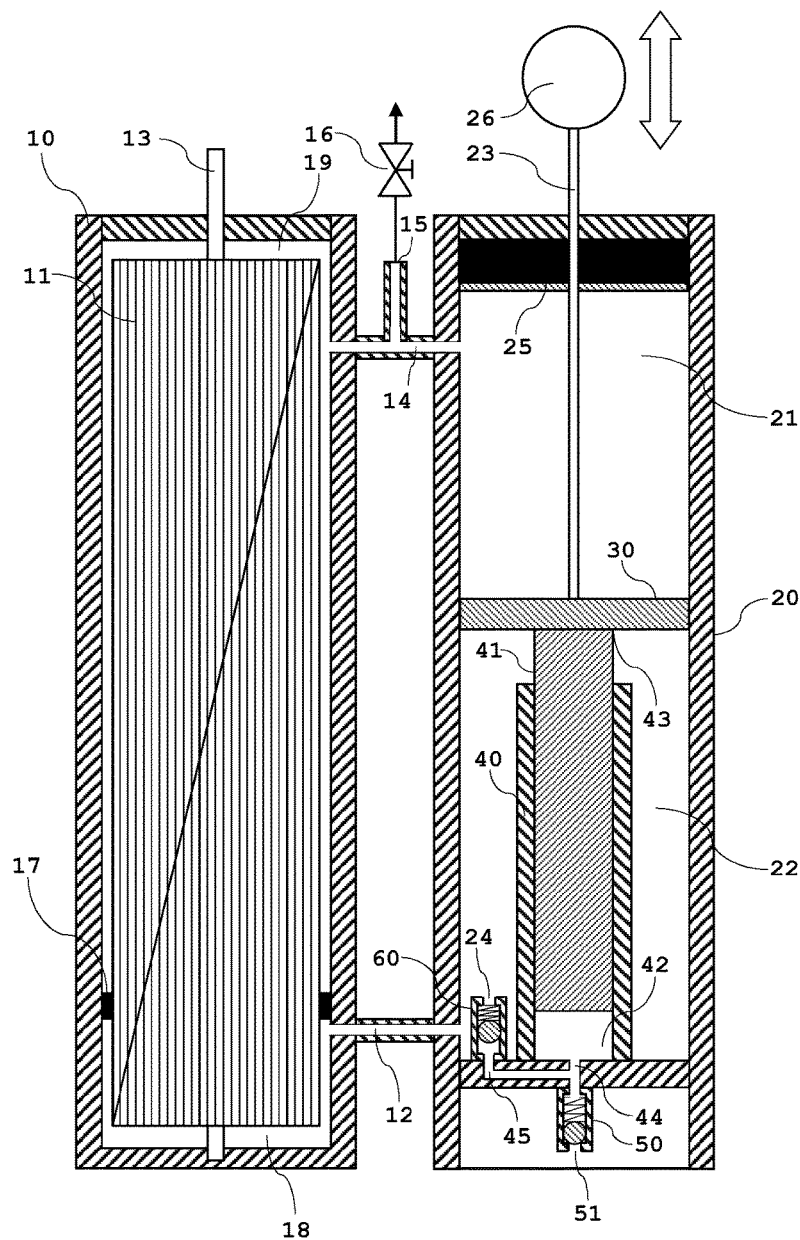
FIG. 3 shows the preferred design of the first embodiment.
Figure 5:
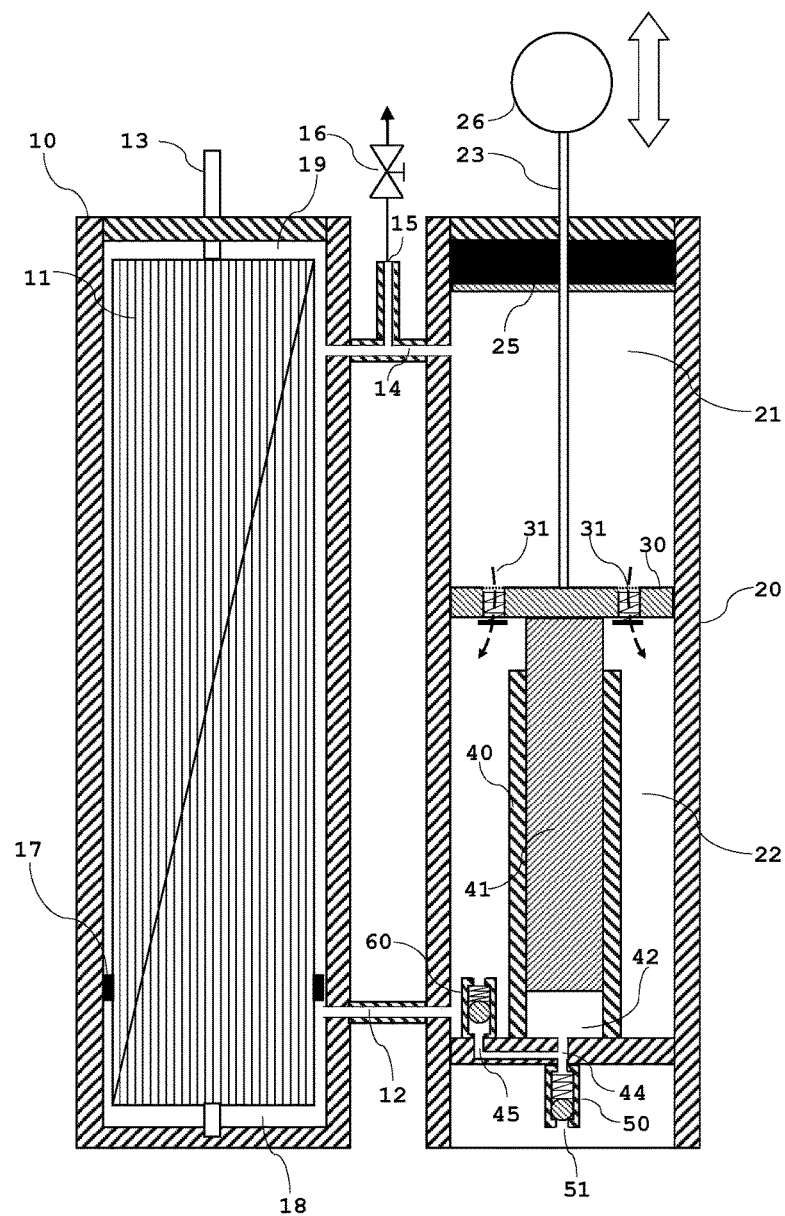
FIG. 5 shows the preferred design of the second embodiment.

(16) is formed as the safety valve then any safety valve is suitable, preferably those where spring tension defines the opening pressure threshold; FIGS. 3 and 5.

Two pumping means are situated within the concentrate cylinder (20) in order to produce and maintain the above mentioned operational pressure.

The first pumping means is formed of a high pressure cylinder (40) and a high pressure piston (41) acting on a pressure chamber (42).

The second pumping means is formed of the said concentrate cylinder (20) and a circulation piston (30) that divides said concentrate cylinder (20) to the return chamber (21) and the water chamber (22), acting on both chambers (21, 20). Return chamber (21), which is positioned above the piston (30), serve as the chamber to collect the concentrate from the outlet chamber (19). The volume of the return chamber (21) is defined by the circulation piston (30) position and sealing means with the cushion (25) situated in the top part of the concentrate cylinder (20). Sealing means with the cushion (25) is used to protect the circulation piston (30) while doing reciprocal motion within the concentrate cylinder (20), and additionally to seal the top of the concentrate cylinder (20) around the piston rod (23).

Piston rod (23) is used for transferring operational power from the outside to the circulation piston (30). Sealing means with the cushion (25) can be manufactured from the metal part that presses the elastomer towards the piston rod (23), in the manner that is common in the art. The piston rod (23) can be connected to any source of mechanical power, but in practice it is expected to be equipped with the handle (26) to facilitate the manpower use.

The first pumping means is situated within the water chamber (22) of the second pumping means. The circulation piston (30) and the high pressure piston (41) are coupled by a piston coupling means (43) in the manner that is known in the art. It is also possible that pistons (30, 41) are manufactured as the same piece of material. Both pistons (30, 41) are activated and moved synchronically with the piston rod (23).

At the bottom of the device, the waste water inlet (51) is connected via the non-return valve (50) and the inlet (44) to the pressure chamber (42) of the first pumping means. Non-return valve allows the fluid to flow only to the pressure chamber (42). The pressure chamber (42) of the first pumping means is connected via the line (45) and another non-return valve (60) via the water inlet (24) to the water chamber (22) of the second pumping means; FIGS. 3 and 5. Said non-return valve (60) allows the fluid to flow from the pressure chamber (42) to the water chamber (22).

Both non-return valves (50, 60) can be of any type known in the art; preferably in the variant of spring and ball type that is simple and durable solution.

Considering the fact that the present invention discloses personal water purification device—this device can be directly immersed into the waste water (80) via its water inlet (51), usually situated at the bottom of the said device. It is possible and highly advisable to add a passive mechanical filter mean (70) at the water inlet (51) of the concentrate cylinder (20) to filter out mechanical particles that may damage and clog the purification device; FIGS. 2A and 2B. Another end of the filter means (70) can be connected via the water inlet (71) to the waste water (80) reservoir. Considering the mechanical filter means used, it can be simple mechanical filter in the form of sieve with appropriate mash size, eventually equipped with the active coal part. Such mechanical or mechanical-active filters are well known in the art.

Figures 4A, 4B:
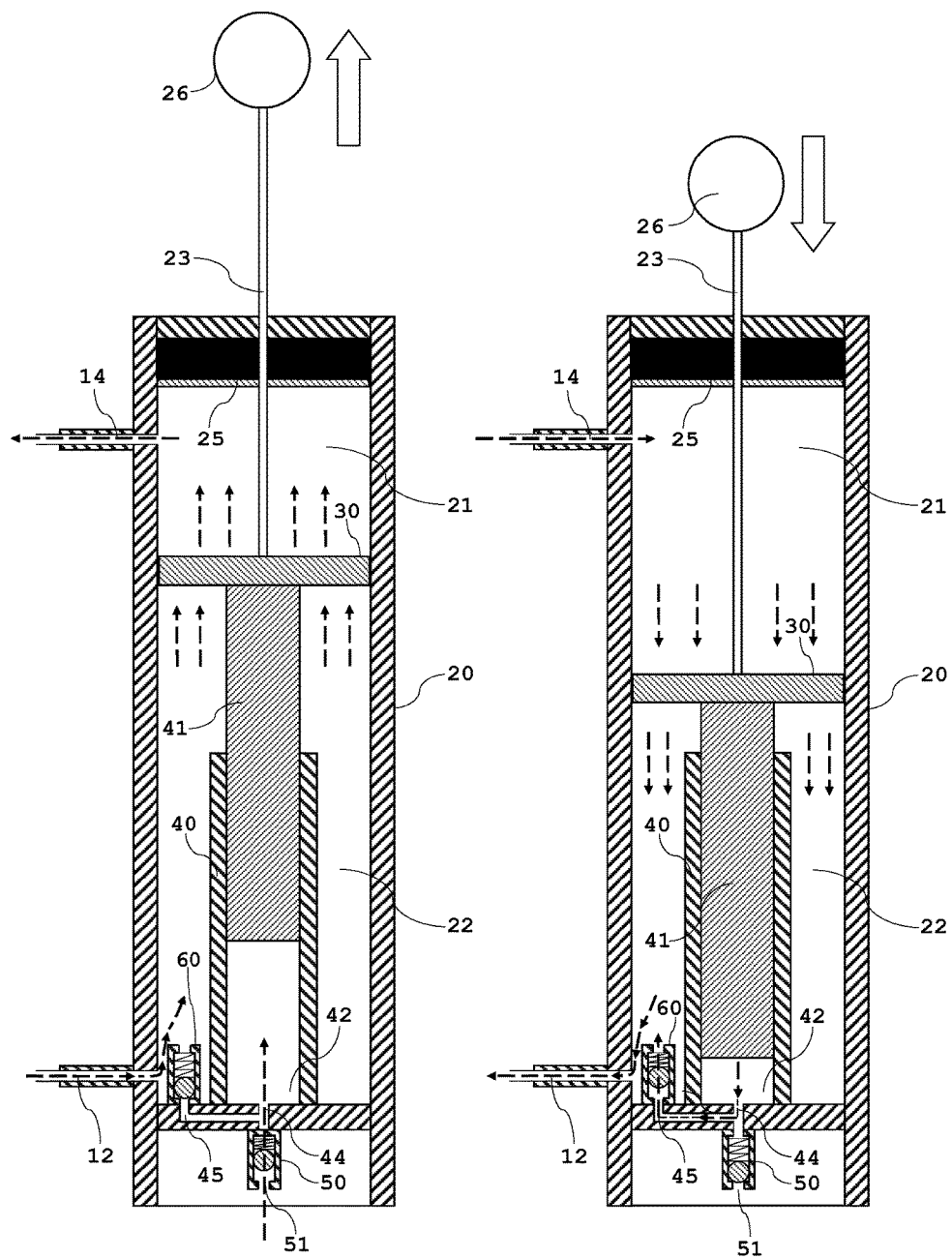
FIGS. 4A and 4B show the fluid circulation within the concentrate cylinder when the external reciprocal force is applied to the device. Direction of the circulation piston rod motion and fluid flow directions within the concentrate cylinder are annotated with the appropriate arrows.
Figures 6A, 6B:
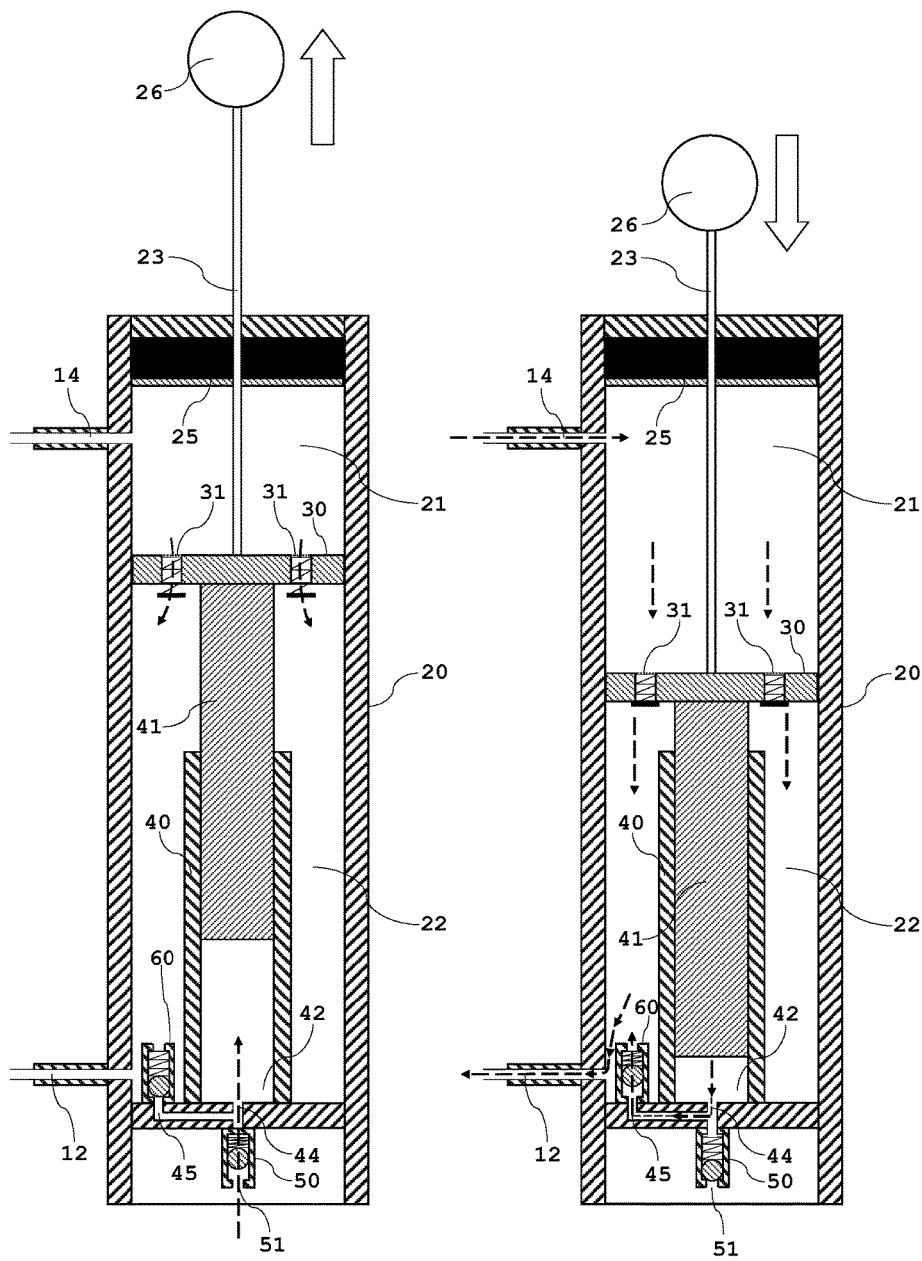
FIGS. 6A and 6B show the fluid circulation within the concentrate cylinder when the external reciprocal force is applied to the device.

So, the first pumping means role is to perform the intake of the waste water into the pressure chamber (42) in stroke-up; FIGS. 4A and 6A. The piston rod (23) stroke down compresses the waste water situated in the pressure chamber (42) by the high pressure piston (41), FIGS. 4B and 6B; the compression starts from the atmospheric pressure to the pressure that is greater than the filter (11) working pressure within the pressurized circuit to allow the fluid flow across the non-return valve (60). Namely, only such pressure will perform injection of the waste water into the already pressurized circuit of the second pumping means; i.e. to the water chamber (22). To achieve that, for the person skilled in the art it is evident that the diameter of the high pressure piston (41) should be considerably smaller that of the circulation piston (30). Careful design will produce any pressure needed for the reliable work of the filtration device. The maximum pressure is determined by the quality of the sealing means with cushion (25) and the overall dimensions and characteristic of the used filters. Intake phase is depicted on the FIGS. 4A and 6A, while injecting phase via FIGS. 4B and 6B for two preferred embodiments.

The pressurized circuit, which maintains filter (11) working pressure, is formed between the second pumping means and the filtration unit (10); FIGS. 3 and 5. The water chamber (22) is connected via the water inlet (12) with the inlet chamber (18). In addition the outlet chamber (19) is connected via the concentrate outlet (14) to the water chamber (21). The pressurized circuit is essential for the proper work of the disclosed device and the part of it is described in more detail below. It is known in the art that the membrane filtration requires high pressure in the inlet chamber (18) to function properly; higher pressure gives better filtration characteristics.

The circulation piston (30) sealing with the concentrate cylinder (20) is not perfect but sufficient for the reliable operation of the pressurized circuit. In the first embodiment depicted on the FIG. 3, back and forth motion of the circulation piston (30) produces the fluid motion within the pressurized circuit. The circulation piston (30) motion is presented on the FIGS. 4A and 4B. In the circulation piston (30) stroke up, the liquid situated into the return chamber (21) is forced to flow through concentrate outlet (14) back into the outlet chamber (19). Such motion of liquid producing additional filtration by recirculation, i.e. circulation back and forth through the filtration unit that effectively lengthens the liquid filtration path and increases the filter effectiveness, due to intensive mixing followed by decrease of the osmotic pressure. This is one of listed technical problems to be solved. It should be noted that the pressure within the pressurized circuit is rather constant with the peaks during the liquid injection phase into the pressurized circuit. Working pressure is maintained several times above the atmospheric pressure which increases the filtration process.

When the piston (30) strokes down, the normal filtration occurs; already pressurized liquid situated within the water chamber (22) is forced to flow through water inlet (12) into the inlet chamber (18) and then across the filter (11) in the circle. Non-perfect sealing between the piston (30) and the concentrate cylinder (20) helps to equalize the pressure differences between the return chamber (21) and water chamber (22) through time, but better sealing increases filtration efficiency. Discharging of permeate via permeate outlet (13) reduce the pressure in the system, namely within the pressurized circuit, and allows the system to operate reliably. However, it is possible to add already discussed auxiliary line (15) and concentrate discharge valve (16) to concentrate outlet (14) which helps in case of any operational problems.

In the second embodiment, depicted on the FIG. 5, back and forth motion of the circulation piston (30) produces also the fluid motion due to the circulation piston (30), as presented on the FIGS. 6A and 6B. The main difference between the first and second embodiment is that the system is further equipped with one or more non-return valves (31) helping to equalize the pressure between the return chamber (21) and the water chamber (22) when piston (30) strokes up. Such non-return valves (31) can be mounted outside or inside the concentrate cylinder (20). Probably the most convenient method is to form a non-return valves (31) as part of the piston (30), see FIGS. 5, 6A and 6B. In the piston (30) stroke up, the liquid situated in the return chamber (21) opens the non-return valves (31) and allows the piston (30) to go up, i.e. towards the sealing means with cushion (25), without pressurizing the liquid in the return chamber (21). Oppositely, in the piston (30) strokes down, the non-return valve (31) is closed and the liquid situated within the water chamber (22) is forced to flow into the inlet chamber (18) via water inlet (12). The said non-return valves (31) can be of any type known in the art; preferably in the form of flap and spring type. This second embodiment can operate smoothly without auxiliary line (15) and concentrate discharge valve (16). This embodiment is very convenient if the waste water consumption is important, it enables circulation and mixture of the concentrate with the already sucked waste water by passing the barrier, i.e. piston (30). As in the first embodiment, the pressure created in the pressurized circle is rather constant with the peaks during the liquid injection phase into the pressurized circuit and several times the atmospheric pressure that also increases filtration process.

It is advisable for each embodiment to have auxiliary line (15) and concentrate discharge valve (16) formed on the concentrate outlet because such design has many other advantages regarding cleaning and maintenance of the personal purification unit.

The device may utilize any reciprocal motion force for the operation, preferably exerted by a person.

INDUSTRIAL APPLICABILITY

Industrial applicability of the invention is obvious. The present invention discloses the personal water purification device having two pumping means and the pressurized circuit with the ability to recirculate the fluids through the membrane filter.

So, the main advantage of the present invention is the ability of the concentrate (re)circulation within the already pressurized circuit that increases the overall percent recovery of filtration process, as disclosed herewith.

REFERENCES 10 filtration unit
11 filter
12 water inlet
13 permeate outlet
14 concentrate outlet
15 auxiliary line
16 concentrate discharge valve
17 sealing means
18 inlet chamber
19 outlet chamber
20 concentrate cylinder
21 return chamber
22 water chamber
23 piston rod
24 water inlet
25 sealing means with cushion
26 handle
30 circulation piston
31 non-return valve
40 high pressure cylinder
41 high pressure piston
42 pressure chamber
43 piston coupling
44 inlet
45 line
50 non-return valve
51 water inlet
60 non-return valve
70 filter means
71 water inlet
80 waste water
90 concentrate discharge line
PW purified water
C concentrate

The invention claimed is:
1. A personal water purification device comprising:
a filtration unit,
two pumping means and
a pressurized circuit; where
the filtration unit is equipped with a filter and a sealing means that separates an inlet chamber for receiving water and an outlet chamber for a concentrate remaining after filtration;
the two pumping means are situated within a concentrate cylinder:
the first pumping means comprises a high pressure cylinder and a high pressure piston acting on a pressure chamber;
the second pumping means comprises the concentrate cylinder and a circulation piston which simultaneously acts on a return chamber and a water chamber situated within the concentrate cylinder;
where the first pumping means is situated within the water chamber of the second pumping means;
where the circulation piston and the high pressure piston are coupled by a piston coupling means, both pistons are activated and moved synchronically with a piston rod;
a water inlet is connected via a first non-return valve to the pressure chamber of the first pumping means that allows the fluid to flow only to the pressure chamber;
the pressure chamber of the first pumping means is connected via a second non-return valve to the water chamber of the second pumping means, where said second non-return valve allows the fluid to flow only to the water chamber; and
the pressurized circuit, which maintains filter working pressure;
wherein:
the pressurized circuit is formed between the second pumping means and the filtration unit such that the water chamber is connected with the inlet chamber and the outlet chamber is connected to the water chamber;
wherein
the piston rod up stroke intakes waste water into the pressure chamber of the first pumping means;
the piston rod down stroke compresses the waste water situated in the pressure chamber by the high pressure piston, the compression starts from the atmospheric pressure to the pressure greater than the filter working pressure within the pressurized circuit, where said compression injects the waste water into the already pressurized circuit of the second pumping means; and where reciprocal motion of the circulation piston from the second pumping means produces fluid circulation through the pressurized circuit and the filter which produces purified water on a permeate outlet of the filter.

2. A personal water purification device according to the claim 1, wherein the water inlet is connected to a passive filter means that is connected to the waste water.

3. A personal water purification device according to the claim 2, wherein the water chamber and return chamber are connected via one or more non-return valves enabling the fluid passage from the return chamber to the water chamber when the circulation piston is engaged by the reciprocal motion of the piston rod; enabling a one-way fluid circulation within the pressurized circuit.

4. A personal water purification device according to the claim 1, wherein the water chamber and return chamber are connected via one or more non-return valves enabling the fluid passage from the return chamber to the water chamber when the circulation piston is engaged by the reciprocal motion of the piston rod; enabling a one-way fluid circulation within the pressurized circuit.

5. A personal water purification device according to the claim 4, wherein the one or more non-return valves are formed on the circulation piston.

6. A personal water purification device according to the claim 5, wherein the non-return valves are of the flap and spring type.

7. A personal water purification device according to claim 4, wherein the first and second non-return valves are formed as spring type non-return valves.

8. A personal water purification device according to claim 1, wherein the filter is a membrane type filter selected from the group consisting of: an ultra-filtration membrane, a nano-filtration membrane and a reverse osmosis membrane.

9. A personal water purification device according to the claim 8, wherein the reciprocal motion of the piston rod is achieved by the man power.

10. A personal water purification device according to claim 9, wherein a concentrate outlet, that connects the outlet chamber and the water chamber, is equipped with an auxiliary line and a concentrate discharge valve connected to a concentrate discharge line for discharging the concentrate from the water purification device.

11. A personal water purification device according to the claim 8, wherein the reciprocal motion of the piston rod is achieved by a motor exerting reciprocal motion.

12. A personal water purification device according to claim 11, wherein a concentrate outlet, that connects the outlet chamber and the water chamber, is equipped with an auxiliary line and a concentrate discharge valve connected to a concentrate discharge line for discharging the concentrate from the water purification device.

13. A personal water purification device according to claim 8, wherein a concentrate outlet, that connects the outlet chamber and the water chamber, is equipped with an auxiliary line and a concentrate discharge valve connected to a concentrate discharge line for discharging the concentrate from the water purification device.

14. A personal water purification device according to the claim 13, wherein the concentrate discharge valve is operated as a safety valve closed when the pressure in the auxiliary line is below the desired pressure.

15. A personal water purification device according to the claim 13, wherein the concentrate discharge valve is operated manually.

* * * * *